(12) United States Patent
Kimura et al.

(10) Patent No.: US 12,429,680 B2
(45) Date of Patent: Sep. 30, 2025

(54) OBJECTIVE LENS UNIT AND MICROSCOPE

(71) Applicant: SCREEN Holdings Co., Ltd., Kyoto (JP)

(72) Inventors: Yuya Kimura, Kyoto (JP); Mitsuhiro Yabu, Kyoto (JP); Yusuke Mori, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 373 days.

(21) Appl. No.: 18/302,173

(22) Filed: Apr. 18, 2023

(65) Prior Publication Data
US 2023/0341671 A1 Oct. 26, 2023

(30) Foreign Application Priority Data

Apr. 25, 2022 (JP) ................... 2022-071750

(51) Int. Cl.
*G02B 21/24* (2006.01)
*G02B 7/16* (2021.01)
*G02B 27/00* (2006.01)

(52) U.S. Cl.
CPC ............ *G02B 21/241* (2013.01); *G02B 7/16* (2013.01); *G02B 21/248* (2013.01); *G02B 27/0068* (2013.01)

(58) Field of Classification Search
CPC ...... G02B 21/241; G02B 7/16; G02B 21/248; G02B 27/0068
USPC ....................................... 359/383
See application file for complete search history.

(56) References Cited

U.S. PATENT DOCUMENTS

| 7,593,173 | B2 | 9/2009 | Harada et al. |
| 9,383,567 | B2 | 7/2016 | Ue et al. |
| 10,928,620 | B2* | 2/2021 | Sakamoto ............ G02B 21/34 |
| 2005/0024718 | A1 | 2/2005 | Sase et al. |
| 2008/0225416 | A1 | 9/2008 | Harada et al. |
| 2015/0022882 | A1* | 1/2015 | Ue ....................... G02B 21/06 |
| | | | 359/385 |

(Continued)

FOREIGN PATENT DOCUMENTS

| JP | 2005-017454 A | 1/2005 |
| JP | 2005-043624 A | 2/2005 |

(Continued)

*Primary Examiner* — Allyson N Trail
(74) *Attorney, Agent, or Firm* — Rimon P.C.

(57) ABSTRACT

An objective lens unit includes an objective lens, a first rotary member, a second rotary member, and a drive section. The objective lens is provided with a correction ring. The first rotary member is mounted on the objective lens. The second rotary member engages with the first rotary member. The first rotary member has a first engagement portion. The second rotary member has a second engagement portion that is to engage with the first engagement portion. The second engagement portion is disposed at a part in the circumferential direction of the second rotary member. The second rotary member rotates to be positioned at an engagement position or a retraction position. The engagement position is a position where the second engagement portion engages with the first engagement portion. The retraction position is a position where the second engagement portion retracts from the first engagement portion.

8 Claims, 17 Drawing Sheets

(56) References Cited

U.S. PATENT DOCUMENTS

| | | | | |
|---|---|---|---|---|
| 2016/0203943 A1* | 7/2016 | Oyagi | ............ | H01J 37/28 |
| | | | | 250/310 |
| 2017/0336611 A1* | 11/2017 | Kubo | ............ | G01N 21/6458 |
| 2018/0203219 A1* | 7/2018 | Matsuzaki | ............ | G02B 21/02 |
| 2023/0221540 A1* | 7/2023 | Liu | ............ | G02B 21/0012 |
| | | | | 359/372 |
| 2025/0164772 A1* | 5/2025 | Lee | ............ | G02B 21/361 |

FOREIGN PATENT DOCUMENTS

| | | | |
|---|---|---|---|
| JP | 2010-243838 | A | 10/2010 |
| JP | 4974717 | B2 | 7/2012 |
| JP | 6037925 | B2 | 12/2016 |
| JP | 6411763 | B2 | 10/2018 |

* cited by examiner

OBJECTIVE LENS UNIT AND MICROSCOPE

INCORPORATION BY REFERENCE

The present application claims priority under 35 U.S.C. § 119 to Japanese Patent Application No. 2022-071750, filed on Apr. 25, 2022. The contents of this application are incorporated herein by reference in their entirety.

BACKGROUND

The present disclosure relates to an objective lens unit and a microscope. Typically, an objective lens unit is known that includes an objective lens with a correction ring, a rotary member that rotates the correction ring, and a drive motor that rotates the rotary member. For example, a microscope device is known that includes an objective lens with a correction ring, a power transmission mechanism such as a gear that engages with the correction gear, and a lens drive mechanism including a motor that drives the power transmission mechanism.

SUMMARY

However, it is difficult for a typical microscope such as the above microscope device to rotate the objective lens for detaching the objective lens from the microscope because the correction ring of the objective lens meshes with a gear of the motor. The objective lens, the gear, and the motor are integral in the typical microscope. As such, it is necessary to detach all of the objective lens, the gear, and the motor in replacement of the objective lens by for example an objective lens with different magnification.

An objective lens unit according to an aspect of the present disclosure includes an objective lens, a first rotary member, a second rotary member, and a drive section. The objective lens is provided with a correction ring. The first rotary member is mounted on the objective lens and rotates together with the correction ring. The second rotary member engages with the first rotary member to rotate the first rotary member. The drive section rotates the second rotary member. The first rotary member has an outer peripheral surface and a first engagement portion formed in the outer peripheral surface. The second rotary member has a second engagement portion that is to engage with the first engagement portion. The second engagement portion is disposed at a part in a circumferential direction of the second rotary member. The second rotary member rotates to be positioned at an engagement position or a retraction position, the engagement position being a position where the second engagement portion engages with the first engagement portion, the retraction position being a position where the second engagement portion retracts from the first engagement portion.

In one aspect of the present disclosure, one of the first engagement portion and the second engagement portion may be provided as one or more indentations. Another of the first engagement portion and the second engagement portion may be provided as one or more pins that are to engage with the one or more indentations.

In one aspect of the present disclosure, the first engagement portion may be provided as the one or more indentations. The second engagement portion may be provided as the one or more pins. The first rotary member includes a first plate with the outer peripheral surface and the first engagement portion. The second rotary member may include a second plate extending in a direction intersecting a rotation axis of the second rotary member. The second engagement portion may protrude from the second plate in a direction in which the rotation axis of the second rotary member extends.

In one aspect of the present disclosure, the objective lens may have a first end and a screw part. The first end may be located at an end in a first direction and may be to be opposite to an object. The screw may be located at an end in a second direction opposite to the first direction and may have a screw thread. The first plate is disposed on a side of the second plate in the first direction.

In one aspect of the present disclosure, the one or more indentations may each have paired inner side surfaces located so as to catch a corresponding one of the one or more pins. The paired inner side surfaces may be located substantially in parallel to each other so as to extend from an outer periphery of the first rotary member toward a central part of the first rotary member.

In one aspect of the present disclosure, the number of the one or more indentations may be the same as the number of the one or more pins.

In one aspect of the present disclosure, the objective lens may further include a detection section that detects a rotation position of the first rotary member being or not being positioned at a reference position. The reference position may be a position where the second engagement portion engages with the first engagement portion in rotation of the second rotary member from the retraction position to the engagement position.

According to one aspect of the present disclosure, a microscope includes the aforementioned objective lens unit and a microscope main body on which the objective lens unit is mounted.

DETAILED DESCRIPTION

Figure 1:
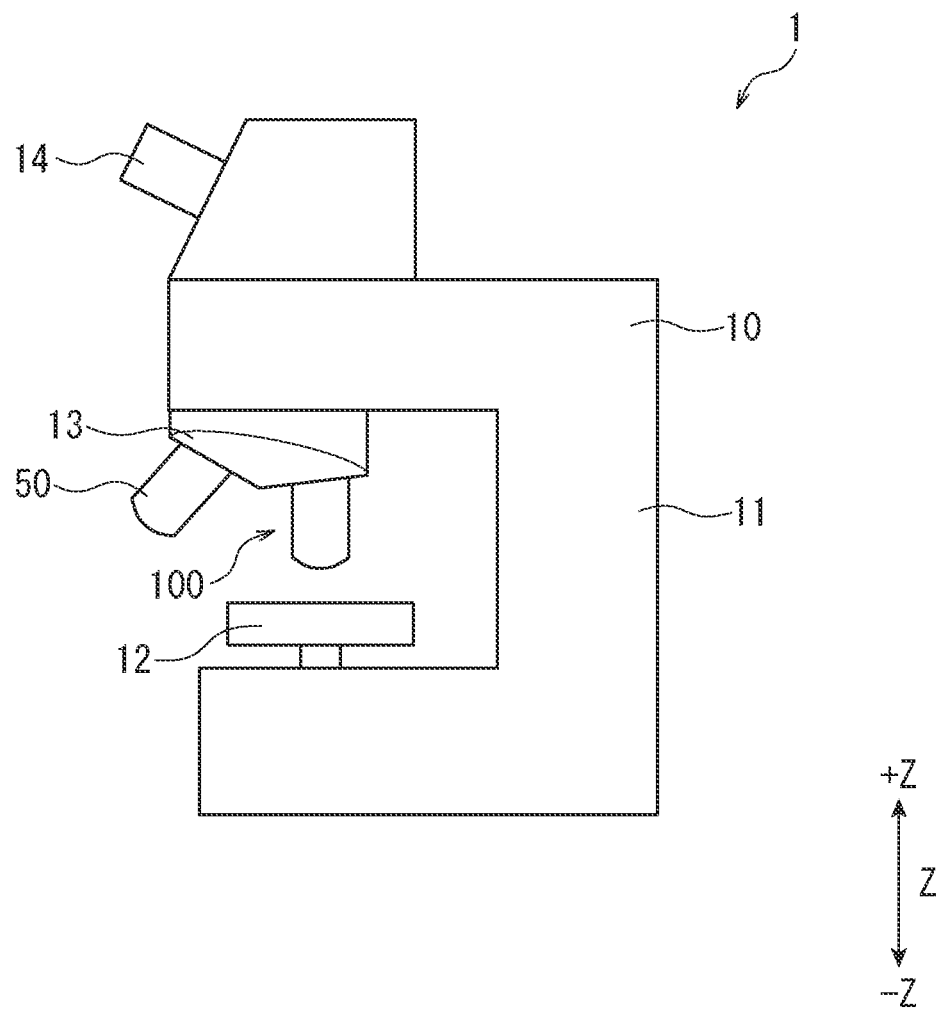
FIG. 1 is a schematic side view of a microscope including an objective lens unit according to an embodiment of the present disclosure.

The following describes an embodiment of the present disclosure with reference to the accompanying drawings. Note that elements that are the same or equivalent are indicated by the same reference signs in the drawings and description thereof is not repeated. In order to facilitate understanding, a Z axis is drawn in drawings as appropriate. In one example, the Z axis is parallel to the vertical direction. The positive direction of the Z axis indicates a vertically upward direction and the negative direction of the Z axis direction indicates a vertically downward direction.

With reference to FIGS. 1 to 16, description will be made of a microscope 1 including an objective lens unit 100 according to an embodiment of the present disclosure. FIG. 1 is a schematic side view of the microscope 1 including the objective lens unit 100 according to an embodiment of the present disclosure.

As illustrated in FIG. 1, the microscope 1 of the present embodiment includes a microscope main body 10 and an objective lens unit 100 mounted on the microscope main body 10. The microscope main body 10 includes a main body 11, a stage 12 on which an object being an observation target is to be placed, a revolving nosepiece 13 on which objective lenses 50 are mounted, an eyepiece 14, and an optical system (not illustrated).

The stage 12, the revolving nosepiece 13, and the eyepiece 14 are arranged at the main body 11. The stage 12 may ascend and descend vertically, for example. The optical system (not illustrated) guides light entering the objective lens 50 to the eyepiece 14. The optical system includes an imaging lens, a prism, and a reflection mirror, for example. The light from the objective lens 50 exits from the eyepiece 14. This enable a user to observe a magnified image of the object through the eyepiece 14.

Figure 2:
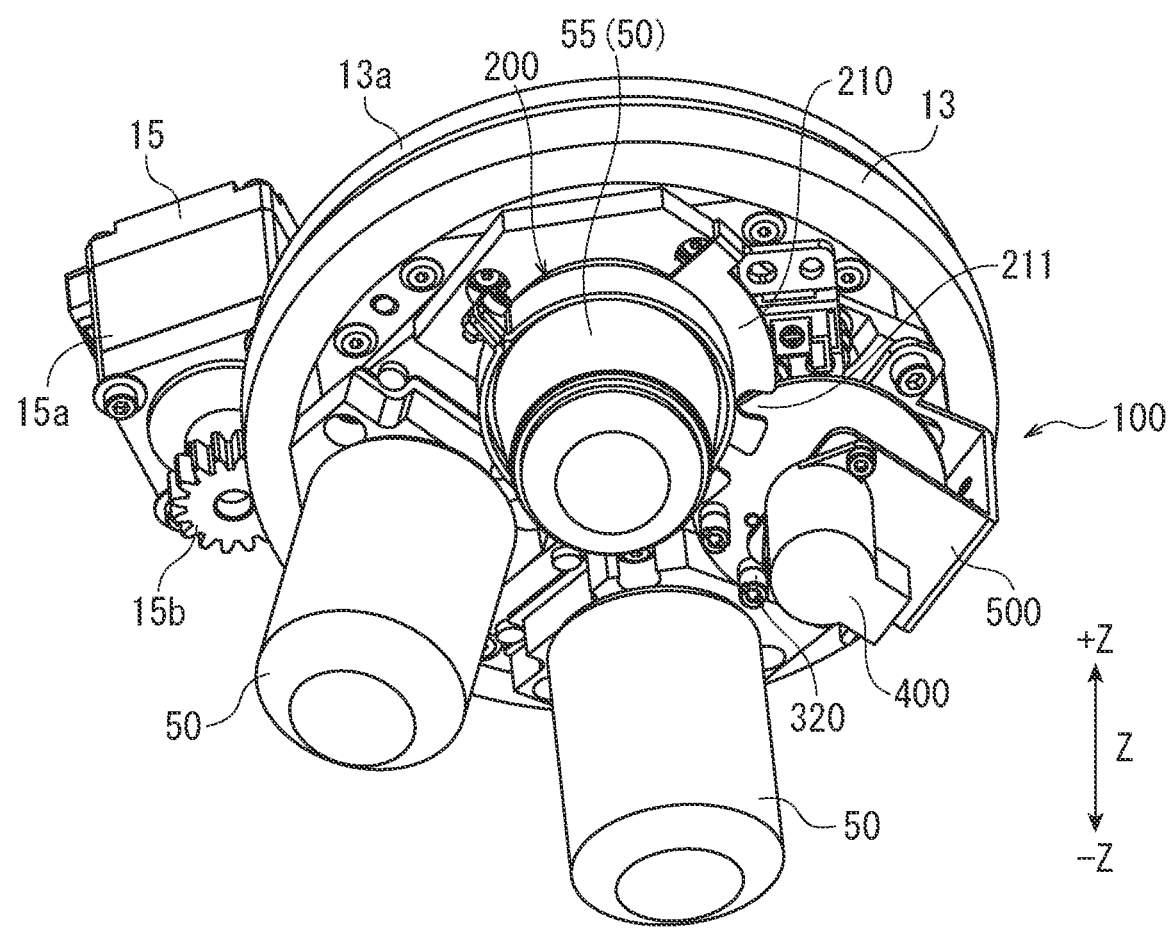
FIG. 2 is a perspective view of the configuration around a revolving nosepiece of the microscope as viewed from a negative Z direction.

FIG. 2 is a perspective view of a configuration around the revolving nosepiece 13 of the microscope 1 as viewed in a negative Z direction. As illustrated in FIG. 2, a plurality of objective lenses 50 are attachably and detachably fitted to the revolving nosepiece 13 in the present embodiment. The revolving nosepiece 13 has a plurality of fitting holes (not illustrated) to which the objective lenses 50 are to be fitted. A screw thread (not illustrated) is formed on the inner circumferential surface of each fitting hole. In the present embodiment, the objective lens unit 100 is mounted on the revolving nosepiece 13 in addition to the objective lenses 50. The revolving nosepiece 13 may be rotatable about the center line (not illustrated) thereof as a center. In the above configuration, the user can select one of the objective lenses 50 that is to be opposite to the object by rotating the revolving nosepiece 13.

For example, an objective lens 55 used in the objective lens unit 100 has a larger magnification than the objective lenses 50 not used in the objective lens unit 100. The magnification of the objective lens 55 used in the objective lens unit 100 is equal to or larger than 20×, for example. By contrast, the magnification of the objective lenses 50 not used in the objective lens unit 100 is less than 20×, for example. The objective lens 50 not used in the objective lens unit 100 may not be provided with correction ring, for example.

The microscope main body 10 includes a revolving nosepiece drive section 15 that rotates the revolving nosepiece 13 in the present embodiment. The revolving nosepiece drive section 15 includes a motor 15a and a drive gear 15b. The revolving nosepiece 13 includes a revolving nosepiece gear 13a engaging with the drive gear 15b. As a result of driving the revolving nosepiece drive section 15, the revolving nosepiece 13 is rotated.

Figure 3:
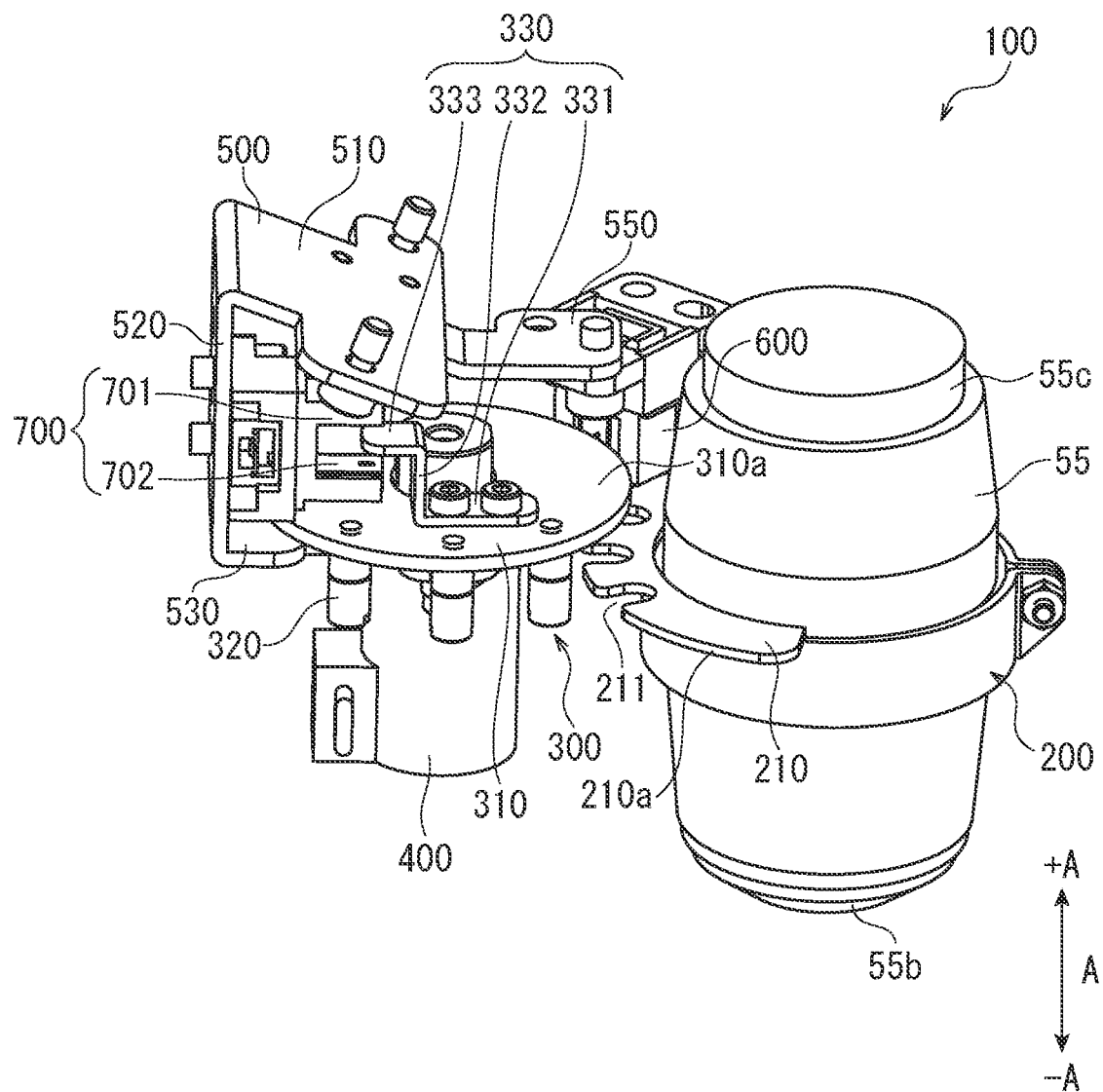
FIG. 3 is a perspective view of a configuration of the objective lens unit as viewed from a positive A direction.
Figure 4:
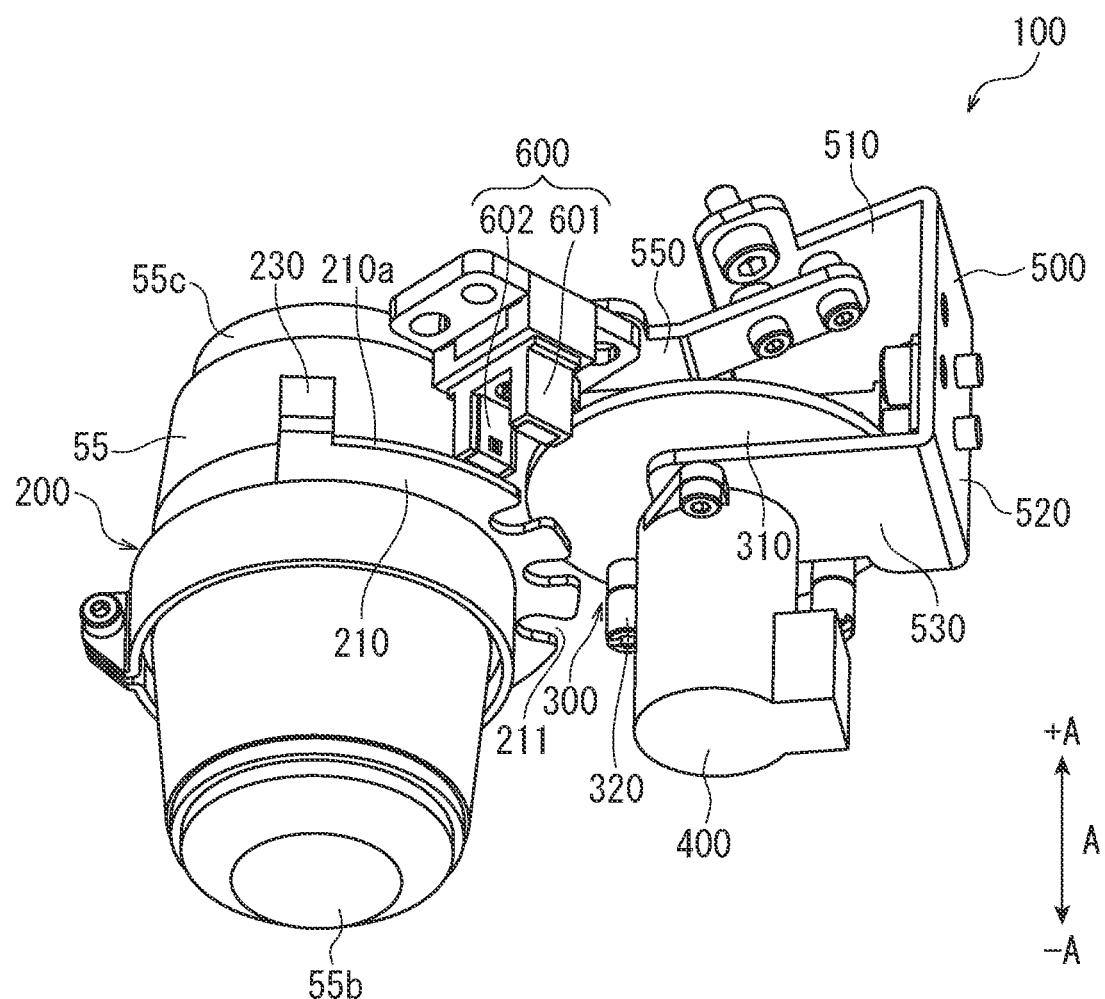
FIG. 4 is a perspective view of the configuration of the objective lens unit as viewed from a negative A direction.
Figure 5:
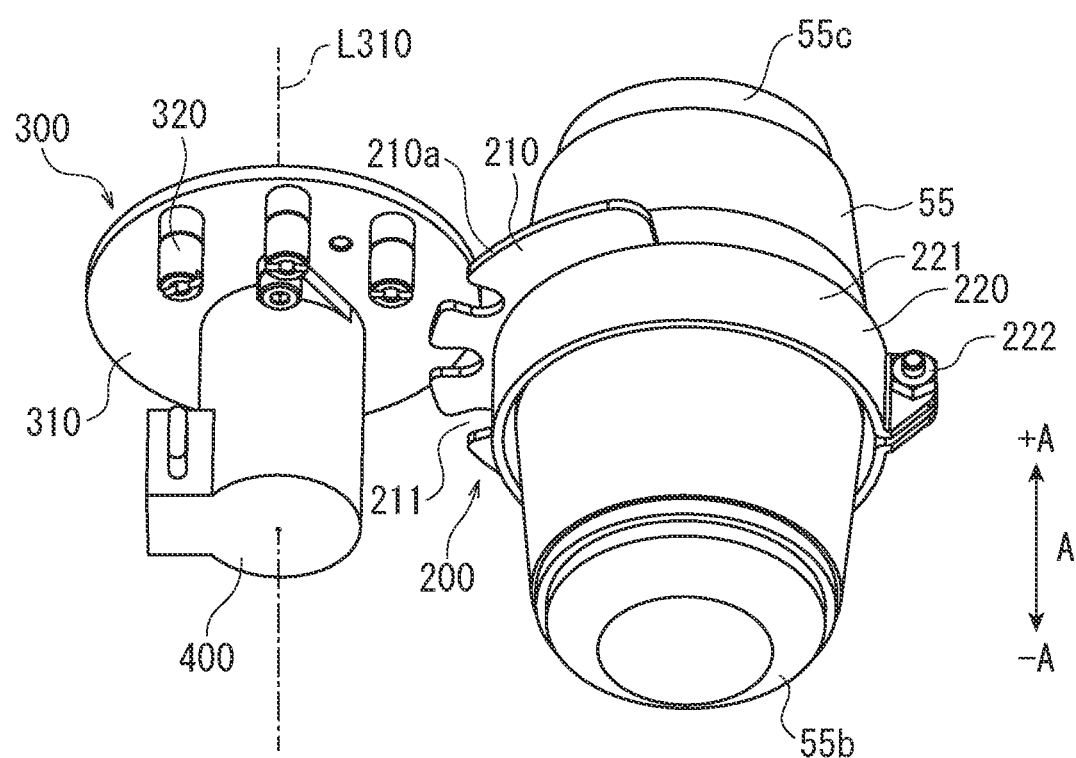
FIG. 5 is a perspective view of each configuration of an objective lens, a first rotary member, a second rotary member, and a drive section of the objective lens unit as viewed from the negative A direction.
Figure 6:
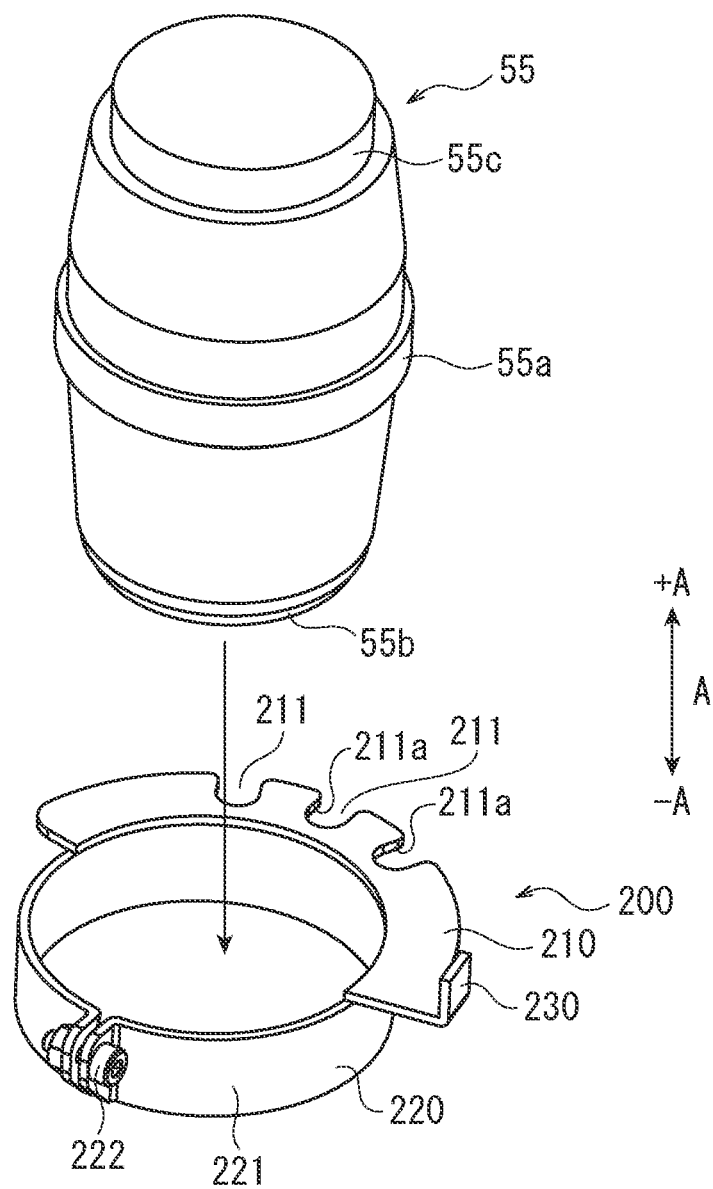
FIG. 6 is an exploded perspective view of each configuration of the objective lens and the first rotary member of the objective lens unit as viewed from the positive A direction.

FIG. 3 is a perspective view of the configuration of the objective lens unit 100 as viewed from a positive A direction. FIG. 4 is a perspective view of the configuration of the objective lens unit 100 as viewed from a negative A direction. FIG. 5 is a perspective view of each configuration of the objective lens 55, a first rotary member 200, a second rotary member 300, and a drive section 400 of the objective lens unit 100 as viewed from the negative A direction. FIG. 6 is an exploded perspective view of each configuration of the objective lens 55 and the first rotary member 200 of the objective lens unit 100 as viewed from the positive A direction. The A direction is a direction in which the optical axis of the objective lens 55 extends. In one example, the A direction is parallel to the vertical direction in a state in which the objective lens 55 is placed opposite to the object (observation target). The positive A direction is a substantially upward direction and the negative A direction is a substantially downward direction.

As illustrated in FIGS. 3 and 4, the objective lens unit 100 includes an objective lens 55 provided with a correction ring 55a (see FIG. 6), a first rotary member 200 mounted on the objective lens 55, a second rotary member 300 that engages with the first rotary member 200, and a drive section 400 that rotates the second rotary member 300. In the present embodiment, the objective lens unit 100 further includes a support member 500 that supports the second rotary member 300 and the drive section 400.

As illustrated in FIGS. 5 and 6, the objective lens 55 has a first end 55b located at an end in the negative A direction thereof and a screw part 55c located at the other end in the positive A direction thereof. Note that the negative A direction is an example of a "first direction" in the present embodiment. Also, the positive A direction is an example of a "second direction" in the present embodiment.

The correction ring 55a (see FIG. 6) is disposed at a substantially central part between the first end 55b and the screw part 55c. The correction ring 55a has an outer circumferential surface with projections and recesses (not illustrated) in the circumferential direction thereof. Rotation of the correction ring 55a moves the optical system such as a lens disposed inside the objective lens 55 in the optical axis direction. Through the above, aberration (spherical aberration) can be corrected.

The first end 55b is to be opposite to the object. Light from the object enters the end 55b. The screw part 55c has a screw thread. The screw part 55c is attachably and detachably fitted in a fitting hole (not illustrated) of the revolving nosepiece 13.

The first rotary member 200 rotates together with the correction ring 55a. Specifically, the first rotary member 200 includes a first plate 210 with first engagement portions 211 and a fixing part 220 that fixes the first plate 210 to the objective lens 55.

The fixing part 220 is disposed around the correction ring 55a. The fixing part 220 includes a band 221 and a fastening section 222 that fastens the band 221 around the objective lens 55. Note that the fastening section 222 includes a bolt and a nut in the present embodiment. Fastening the band 221 by the fastening section 222 fixes the fixing part 220 to the correction ring 55a. The first rotary member 200 accordingly rotates together with the correction ring 55a. Note that the band 221 is made of a metal sheet, for example.

The first plate 210 is arc-shaped or fan-shaped, for example. The inner rim of the first plate 210 is fixed to the band 221. Note that the first plate 210 is made of a metal sheet, for example.

Furthermore, the first plate 210 has an outer peripheral surface 210a and first engagement portions 211 formed in the outer peripheral surface 210a. In the present embodiment, the first plate 210 includes a plurality of (3 in this case) first engagement portions 211. The first engagement portions 211 are spaced at equal angular intervals in the circumferential direction of the first plate 210. Furthermore, each of the first engagement portions 211 has an indented shape. In other words, the first engagement portions 211 are indentations. Accordingly, the first engagement portions 211 can be easily formed in the first plate 210 made of a metal sheet.

Figure 7:
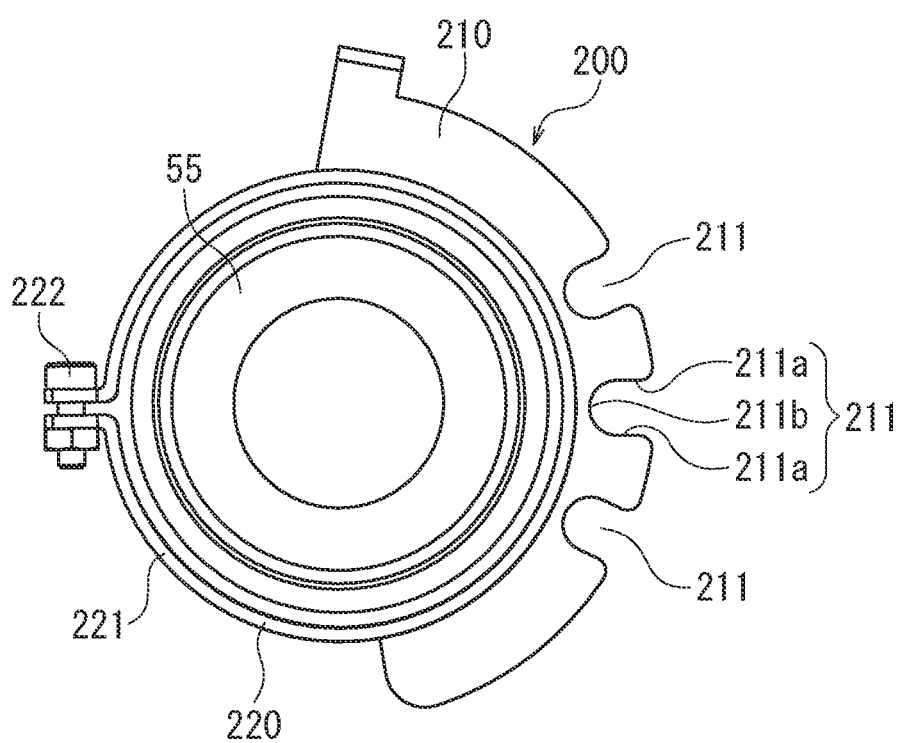
FIG. 7 is a diagram illustrating each configuration of the objective lens and the first rotary member of the objective lens unit as viewed from the negative A direction.

FIG. 7 is a diagram illustrating each configuration of the objective lens 55 and the first rotary member 200 of the objective lens unit 100 as viewed from the negative A direction. The first engagement portions 211 are U-shaped, for example. Specifically, each first engagement portion 211 has paired inner side surfaces 211a and a connection surface 211b. Here, the paired inner side surfaces 211a are located so as to catch a later-described second engagement portion 320 and the connection surface 211b connects the paired inner side surfaces 211a to each other (see FIG. 7). The paired inner side surfaces 211a extend toward the center from the outer periphery of the first rotary member 200. The paired inner side surfaces 211a are arranged substantially in parallel to each other. The connection surface 211b has a semicircular arc shape, for example.

As illustrated in FIG. 6, the first rotary member 200 includes a to-be-detected portion 230. The to-be-detected portion 230 is a portion of the first rotary member 200 that is to be detected by a later described first detection section 600. The to-be-detected portion 230 is not limited specifically, and may be located on the outer periphery of the first plate 210, for example. Furthermore, the to-be-detected portion 230 protrudes in a direction (A direction) intersecting with the first plate 210. The first plate 210 and the to-be-detected portion 230 are constituted by a single member in the present embodiment.

Furthermore, the first plate 210 is located on the side of the later-described second plate 310 in the negative A direction in the present embodiment as illustrated in FIGS. 3 and 4.

The second rotary member 300 engages with the first rotary member 200 to rotate the first rotary member 200. Specifically, the second rotary member 300 includes a second plate 310 and second engagement portions 320 that each are to engage with corresponding one of the first engagement portions 211 of the first rotary member 200. Note that the second plate 310 is made of a metal sheet, for example. Furthermore, the second engagement portions 320 each are a bar member made of metal, for example.

The second plate 310 extends in a direction (radial direction) intersecting with a rotation axis L310 of the second rotary member 300. The shape of the second plate 310 is not limited specifically and may be a disc shape, for example. The rotation axis L310 passes through the center of the second plate 310. The second rotary member 300 is rotatable about the rotation axis L310.

The second engagement portions 320 are arranged on a part in the circumferential direction of the second rotary member 300. The second engagement portions 320 are arranged on a part in the circumferential direction of the outer peripheral part of the second plate 310. In the above configuration, the second rotary member 300 rotates to position each second engagement portion 320 at an engagement position or a retraction position.

Here, the engagement position is a position where at least one of the second engagement portions 320 engages with a corresponding one of the first engagement portions 211 and the retraction position is a position where the second engagement portions 320 retract from the first engagement portions 211.

The second engagement portions 320 are each formed so as to protrude from the second plate 310 to engage with a corresponding one of the first engagement portions 211, for example. The second engagement portions 320 each include a pin that engages with a corresponding one of the first engagement portions 211 (indentations) in the present embodiment. The shape of the second engagement portions 320 is not limited specifically and is a columnar or cylindrical shape in the present embodiment. The second engagement portions 320 have a length longer than the thickness of the first engagement portions 211 in the A direction, for example. In other words, the second engagement portions 320 protrude in both the positive A direction and the negative A direction from the first engagement portion 211.

The second engagement portions 320 protrude from the second plate 310 in a direction in which the rotation axis L310 extends (see FIG. 5). The second engagement portions 320 protrude from the second plate 310 in the negative A direction in the present embodiment.

The second rotary member 300 includes a plurality of second engagement portions 320 in the present embodiment. Furthermore, the number of the first engagement portions 211 is the same as the number of the second engagement portions 320 in the present embodiment. The second engagement portions 320 are disposed at equal angular intervals in the circumferential direction.

The second rotary member 300 includes a to-be-detected portion 330. The to-be-detected portion 330 is a portion of the second rotary member 300 that is to be detected by a later-described second detection section 700. The to-be-detected portion 330 is not limited specifically and may be disposed on a surface 310a in the positive A direction of the second plate 310, for example. Note that the to-be-detected portion 330 may be disposed on a part of the second plate 310 other than the surface 310a thereof or on any of the second engagement portions 320. Alternatively, the to-be-detected portion 330 may be constituted by a part of the second plate 310 or a part of the second engagement portion 320. That is, the to-be-detected portion 330 and the second plate 310 may be constituted by a single member or the to-be-detected portion 330 and the second engagement portion 320 may be constituted by a single member.

The to-be-detected portion 330 is formed for example by bending a metal piece. The to-be-detected portion 330 includes a mount portion 331 mounted on the second plate 310, an extension portion 332 extending from the mount portion 331 in the A direction, and an end portion 333 extending in parallel to the second plate 310 from the extension portion 332.

The drive section 400 rotates the second rotary member 300 in the positive and negative directions by a specific angle, for example. The drive section 400 rotates the second rotary member 300 through a non-illustrated gear or the like, for example. The drive section 400 includes a motor such as a stepper motor, for example. Note that the drive section 400 may not include the motor as long as it is capable of rotating the second rotary member 300 in the positive and negative directions by the specific angle. Furthermore, the drive section 400 is disposed along the rotation axis L310 (see FIG. 5), for example.

The support member 500 is formed by bending a metal sheet. The support member 500 includes a mount portion 510 mounted on the revolving nosepiece 13, an extension portion 520 extending in the negative A direction from the mount portion 510, and a support portion 530 extending in a direction intersecting with the extension portion 520. The drive section 400 is fixed to the support portion 530, and the second rotary member 300 is rotatable relative to the support portion 530.

The objective lens unit 100 further includes a first detection section 600 and a second detection section 700. The first detection section 600 is fixed to the support member 500. In the present embodiment, the first detection section 600 is fixed to the mount portion 510 of the support member 500 through a connection piece 550. The second detection section 700 is fixed to the support member 500. The second detection section 700 is fixed to the extension portion 520 of the support member 500 in the present embodiment. Note that the first detection section 600 is an example of a "detection section" in the present disclosure.

The first detection section 600 is a member to detect the rotation position of the first rotary member 200 being or not being positioned at a later-described first reference position P100. The first detection section 600 is a sensor, for example. The first detection section 600 transmits a detection signal to a later-described controller 2a. The first detection section 600 detects the to-be-detected portion 230 in the present embodiment. Specifically, the first detection section 600 includes a light projector 601 that projects light and a light receiver 602 that receives the light from the light projector 601. When the to-be-detected portion 230 is positioned between the light projector 601 and the light receiver 602, the light projected from the light projector 601 is blocked by the to-be-detected portion 230 and is not received by the light receiver 602. The controller 2a determines whether or not the to-be-detected portion 230 is positioned between the light projector 601 and the light receiver 602 based on the detection signal from the first detection section 600. In the present embodiment, the rotation position of the first rotary member 200 when the to-be-detected portion 230 is positioned between the light projector 601 and the light receiver 602 corresponds to a later-described first reference position P100. That is, it is possible to detect the rotation position of the first rotary member 200 being or not being positioned at the first reference position P100 based on a result of detection of the to-be-detected portion 230 by the first detection section 600.

The second detection section 700 is a member for detecting the rotation position of the second rotary member 300 being or not being positioned at a later-described second reference position P200. The second detection section 700 is a sensor, for example. The second detection section 700 transmits a detection signal to the later-described controller 2a. In the present embodiment, the second detection section 700 detects the to-be-detected portion 330. Specifically, the second detection section 700 includes a light projector 701 that projects light and a light receiver 702 that receives the light from the light projector 701, for example. When the end portion 333 of the to-be-detected portion 330 is positioned between the light projector 701 and the light receiver 702, the light projected from the light projector 701 is blocked by the to-be-detected portion 330 and is not received by the light receiver 702. The controller 2a determines whether or not the to-be-detected portion 330 is located between the light projector 701 and the light receiver 702 based on a signal from the second detection section 700. In the present embodiment, the rotation position of the second rotary member 300 when the to-be-detected portion 330 is positioned between the light projector 701 and the light receiver 702 corresponds to the later-described second reference position P200. That is, it is possible to detect the rotation position of the second rotary member 300 being or not being positioned at the second reference position P200 based on a result of detection of the to-be-detected portion 330 by the second detection section 700.

Figure 8:
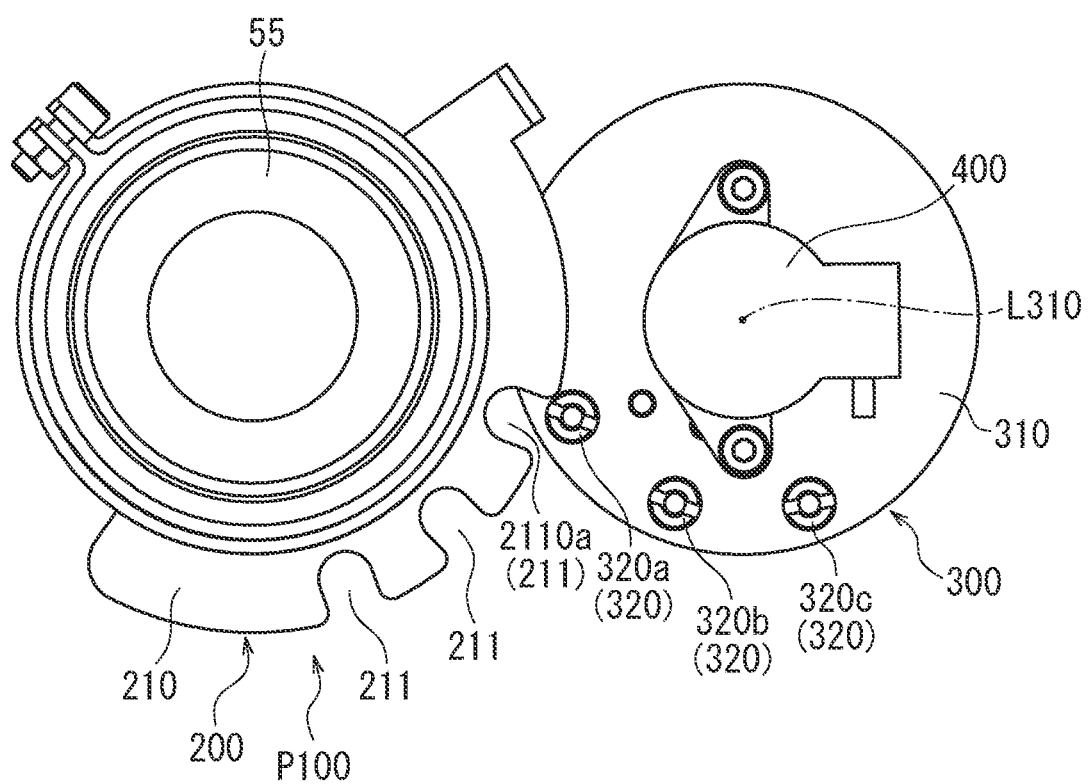
FIG. 8 is a diagram illustrating a state in which the first rotary member is positioned at a first reference position as viewed from the negative A direction.
Figure 9:
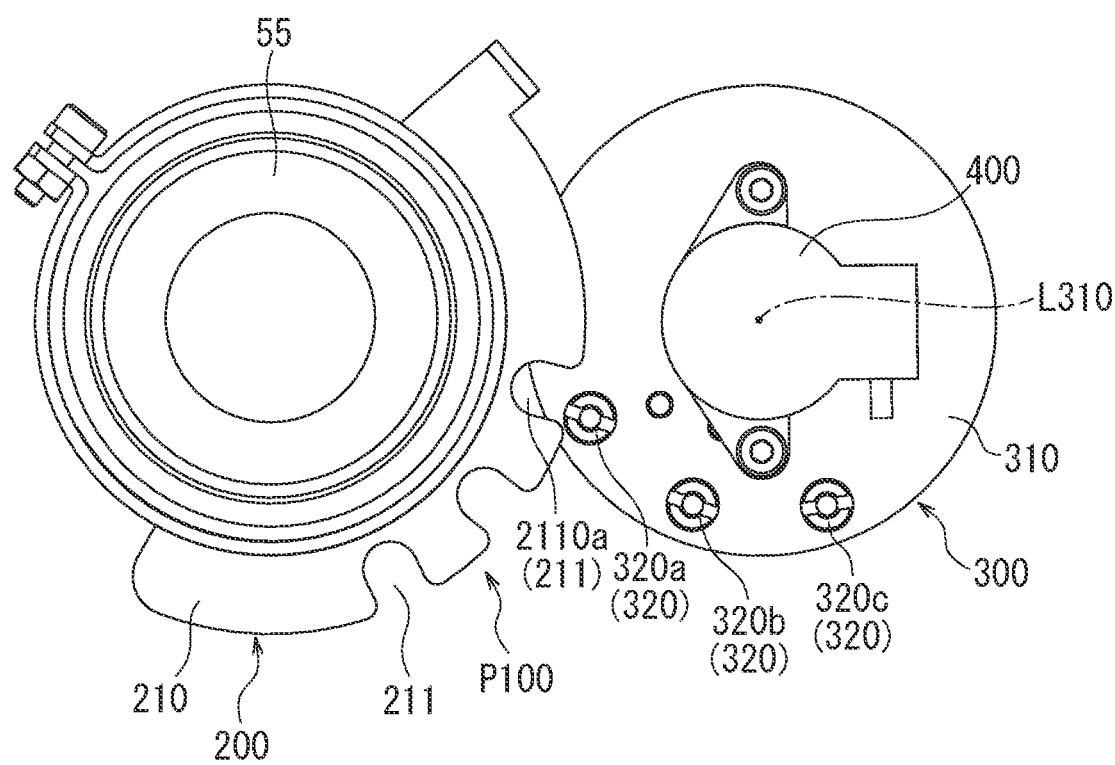
FIG. 9 is a diagram illustrating a state in which the first rotary member is positioned at the first reference position as viewed from the negative A direction.
Figure 10:
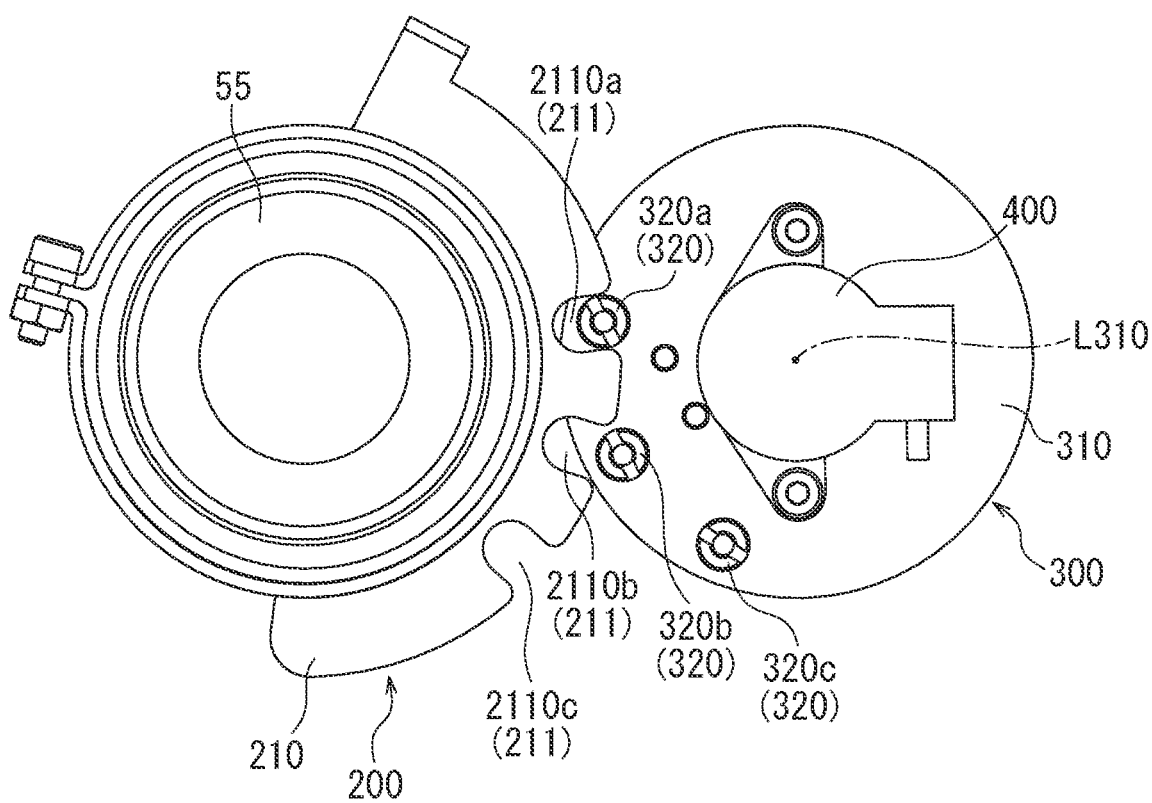
FIG. 10 is a diagram illustrating a state in which a first engagement portion and a second engagement portion engage with each other as viewed from the negative A direction.
Figure 11:
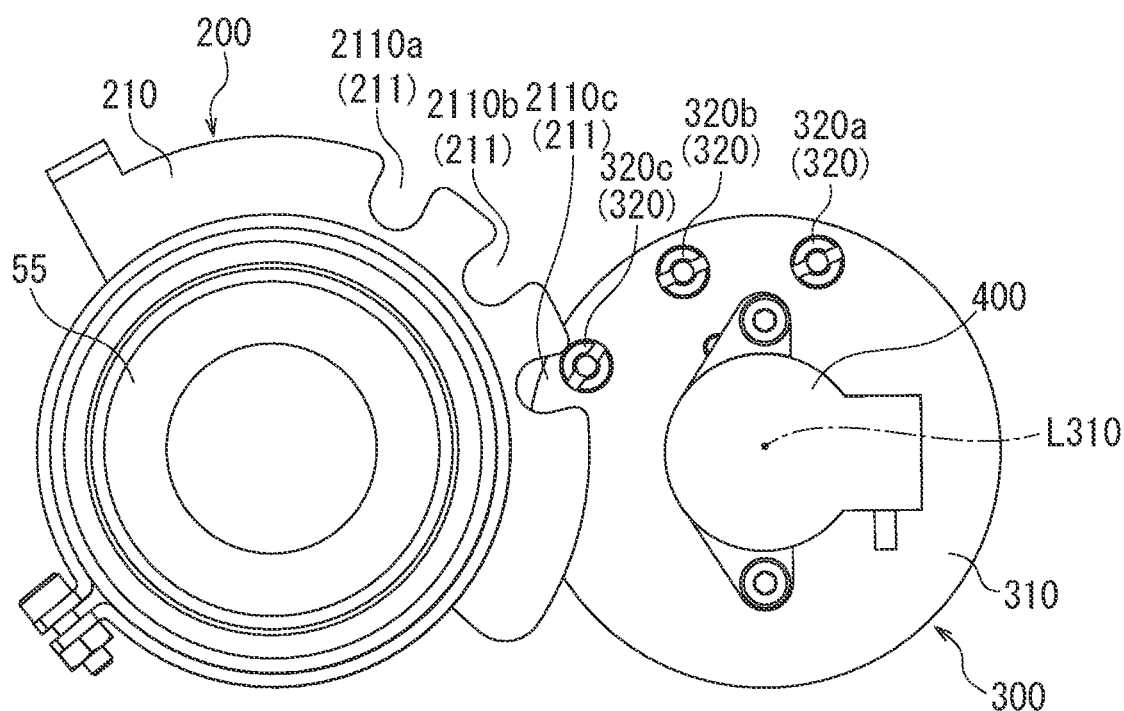
FIG. 11 is a diagram illustrating a state in which a first engagement portion and a second engagement portion engage with each other as viewed from the negative A direction.
Figure 12:
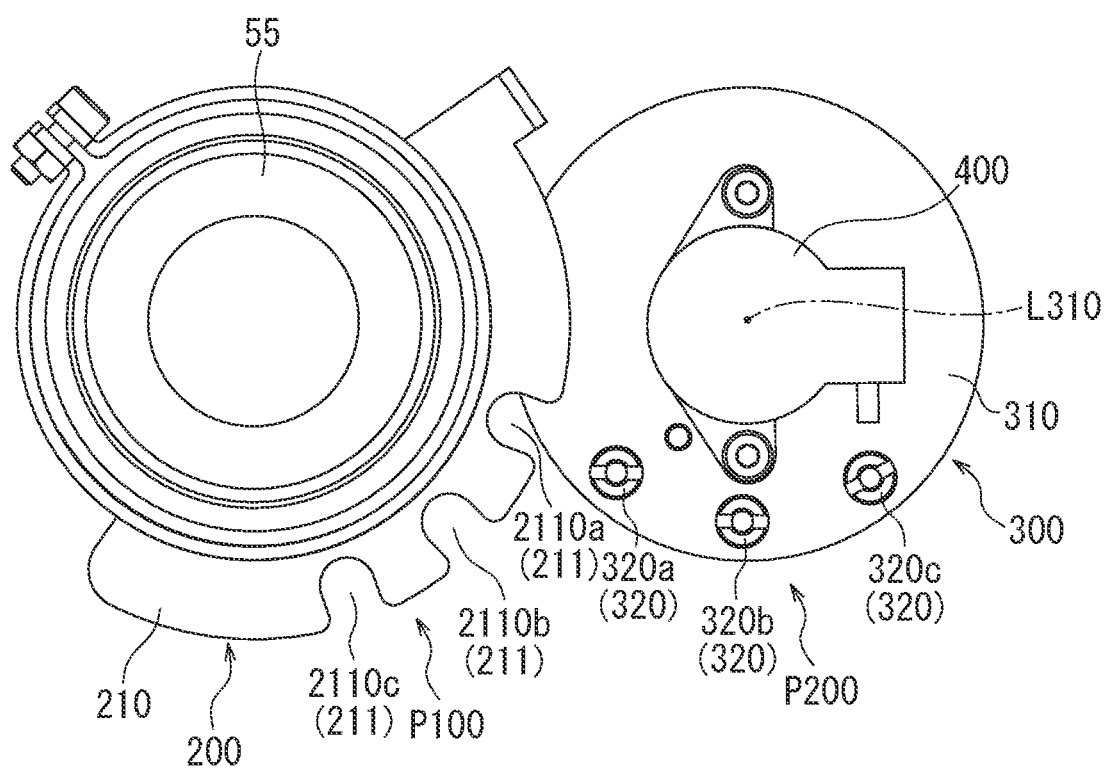
FIG. 12 is a diagram illustrating a state in which the first rotary member is positioned at the first reference position and the second rotary member is positioned at a second reference position as viewed from the negative A direction.

With reference to FIGS. 8 to 12, engagement between the first rotary member 200 and the second rotary member 300 will be described next in detail. FIG. 8 is a diagram illustrating a state in which the first rotary member 200 is positioned at the first reference position P100 as viewed from the negative A direction. FIG. 9 is a diagram illustrating a state in which the first rotary member 200 is positioned at the first reference position P100 as viewed from the negative A direction. FIG. 10 is a diagram illustrating a state in which a first engagement portion 211 and a second engagement portion 320 engage with each other as viewed from the negative A direction. FIG. 11 is a diagram illustrating a state in which a first engagement portion 211 and a second engagement portion 320 engage with each other as viewed from the negative A direction. FIG. 12 is a diagram illustrating a state in which the first rotary member 200 is positioned at the first reference position P100 and the second rotary member 300 is positioned at the second reference position P200 as viewed from the negative A direction. Note that only the objective lens 55, the first rotary member 200, the second rotary member 300, and the drive section 400 are illustrated in FIGS. 8 to 12 in order to facilitate understanding.

The first engagement portions 211 of the first rotary member 200 and the second engagement portions 320 of the second rotary member 300 engage with each other. In the present embodiment, the three second engagement portions 320 sequentially engage with the corresponding three first engagement portions 211 by rotation of the second rotary member 300 about the rotation axis L310. Specifically, a second engagement portion 320a engages with a first engagement portion 2110a as illustrated in FIGS. 8 to 11. A second engagement portion 320b engages with a first engagement portion 2110b. A second engagement portion 320c engages with a first engagement portion 2110c.

Here, the second rotary member 300 rotates to be positioned at an engagement position or a retraction position. The engagement position is a rotation position of the second rotary member 300 when a second engagement portion 320 and a first engagement portion 211 engage with each other. The retraction position is a rotation position of the second rotary member 300 when the second engagement portions 320 retract from the first engagement portions 211. In the present embodiment, the engagement position is a rotation position of the second rotary member 300 when a second engagement portion 320 is in contact with a first rotary member 200. The retraction position is a rotation position of the second rotary member 300 when the second engagement portions 320 separate from the first rotary member 200. The engagement position includes the positions illustrated in FIGS. 8 to 11, for example. The retraction position includes the position illustrated in FIG. 12, for example.

When the second rotary member 300 is rotated in a state in which the second rotary member 300 is positioned at the engagement position, the first rotary member 200 is also rotated. However, due to the load of the drive section 400, the first rotary member 200 and the second rotary member 300 are not rotated even when the first rotary member 200 is tried to rotate. Furthermore, in a state in which the second rotary member 300 is positioned at the retraction position, one of the first rotary member 200 and the second rotary member 300 is not rotated even if the other of the first rotary member 200 and the second rotary member 300 is rotated. That is, when the second rotary member 300 is positioned at the retraction position, the objective lens 55 and the first rotary member 200 can be rotated for attachment and detachment thereof to and from the revolving nosepiece 13.

The second reference position P200 is a rotation position of the second rotary member 300. Specifically, the second reference position P200 is a rotation position at which the second rotary member 300 is positioned in attachment of the objective lens 55 and the first rotary member 200 to the revolving nosepiece 13. In the present embodiment, the second reference position P200 is a rotation position at which the second rotary member 300 is positioned in detachment of the objective lens 55 and the first rotary member 200 from the revolving nosepiece 13. The second reference position P200 is included in the retraction position.

The first reference position P100 is a rotation position of the first rotary member 200. Specifically, the first reference position P100 is a rotation position at which the first rotary member 200 is positioned in engagement of the second rotary member 300 with the first rotary member 200. The first reference position P100 ranges from the position illustrated in FIG. 8 to the position illustrated in FIG. 9. For example, even when the first rotary member 200 is positioned at the rotation position illustrated in FIG. 8 or the rotation position illustrated in FIG. 9, a second engagement portion 320 engages with a first engagement portion 211 by rotating the second rotary member 300 in the clockwise direction. In the present embodiment, the rotation positions of the first rotary member 200 differ by approximately 6 degrees to 10 degrees between FIGS. 8 and 9. That is, control of the rotation position of the first rotary member 200 with an accuracy of ±3 degrees to ±5 degrees can prevent the second engagement portions 320 from coming into contact with a part of the first rotary member 200 that is other than the corresponding first engagement portions 211. Accordingly, control of the rotation position of the first rotary member 200 with an accuracy of ±3 degrees to ±5 degrees can facilitate engagement of a second engagement portion 320 with a first engagement portion 211.

Figure 13:
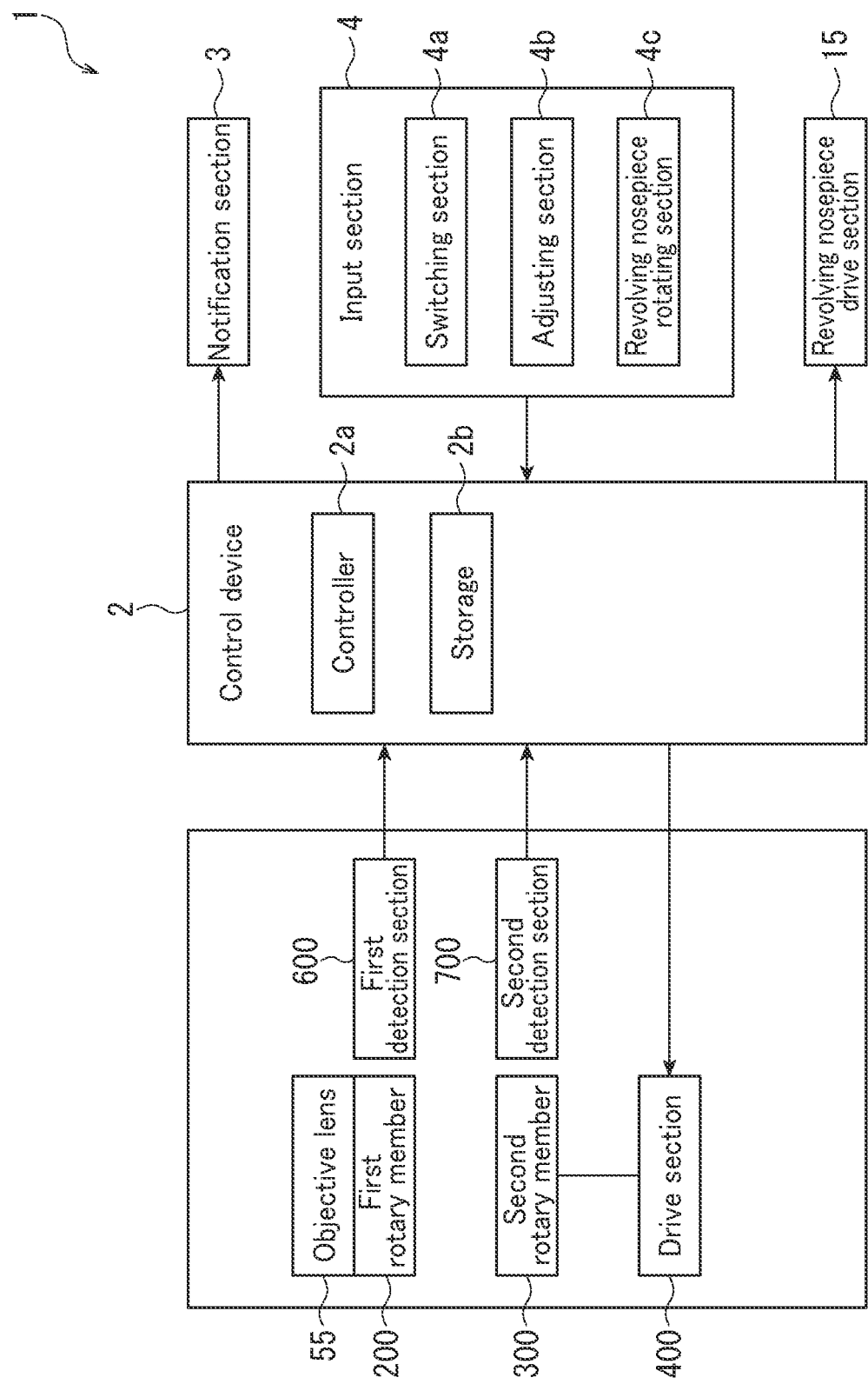
FIG. 13 is a block diagram of a configuration of the microscope.

FIG. 13 is a block diagram of a configuration of the microscope 1. As illustrated in FIG. 13, the microscope 1 further includes a control device 2, a notification section 3, and an input section 4. The control device 2 controls various operations of the microscope 1.

The control device 2 includes a controller 2a and storage 2b. The controller 2a includes a processor. The controller 2a includes a central processing unit (CPU), for example.

The storage 2b stores data and computer programs therein. The storage 2b includes a main storage device and an auxiliary storage device. The main storage device is semiconductor memory, for example. The auxiliary storage device includes either or both semiconductor memory and a hard disk drive, for example. The storage 2b may include a removable medium.

The controller 2a executes the computer programs stored in the storage 2b to perform the operation of the microscope 1. The controller 2a transmits a first position signal to the notification section 3 based on the detection signal from the first detection section 600. The first position signal is a signal indicating whether or not the first rotary member 200 is positioned at the first reference position P100. The controller 2a further transmits a second position signal to the notification section 3 based on the detection signal from the second detection section 700. The second position signal is a signal indicating whether or not the second rotary member 300 is positioned at the second reference position P200.

The notification section 3 notifies that the first rotary member 200 is or is not positioned at the first reference position P100 based on the first position signal from the controller 2a. The notification section 3 also notifies that the second rotary member 300 is or is not positioned at the second reference position P200 based on the second position signal from the controller 2a. The notification section 3 is not limited specifically, and includes a display screen that displays notification content, for example. Note that the notification section 3 may include an indictor lamp or a speaker that emits sound, for example.

The input section 4 includes an operation section that the user operates. The input section 4 includes a switching section 4a, an adjusting section 4b, and a revolving nosepiece rotating section 4c. The switching section 4a is a member for switching the rotation position of the second rotary member 300 between the retraction position and the engagement position, for example. The adjusting section 4b is a member for adjusting the rotation position of the second rotary member 300, for example. The adjusting section 4b can rotate the second rotary member 300 for example by a specific angle in the positive and negative directions. The revolving nosepiece rotating section 4c is a member for rotating the revolving nosepiece 13. The switching section 4a, the adjusting section 4b, and the revolving nosepiece rotating section 4c each include any of a switch, a button, a lever, or a dial, for example.

The controller 2a controls the rotation position of the second rotary member 300 based on a signal from the switching section 4a. The controller 2a controls the rotation position of the second rotary member 300 based on a signal from the adjusting section 4b. The controller 2a controls the rotation position of the revolving nosepiece 13 based on a signal from the revolving nosepiece rotating section 4c.

Figure 14:
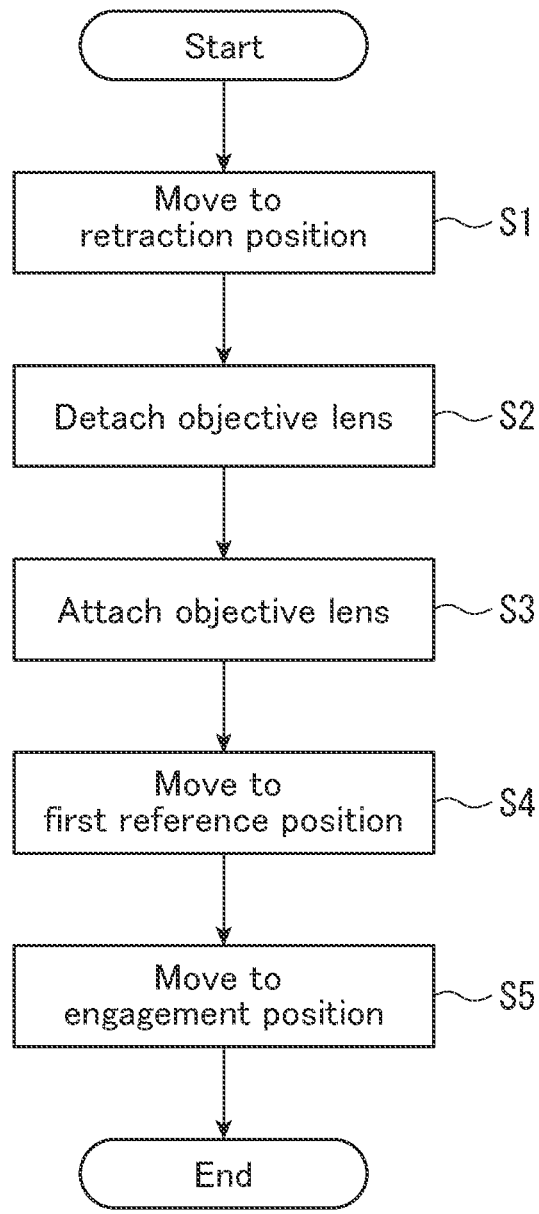
FIG. 14 is a flowchart depicting an example of a method for replacing the objective lens of the objective lens unit.

With reference to FIG. 14, a method for replacing the objective lens 55 of the objective lens unit 100 will be described next. FIG. 14 is a flowchart depicting an example of the method for replacing the objective lens 55 of the objective lens unit 100.

As depicted in FIG. 14, the second rotary member 300 is set at the retraction position in Step S1. Specifically, the user operates the switching section 4a to move the second rotary member 300 from the engagement position to the retraction position. The controller 2a drives the drive section 400 to rotate the second rotary member 300. As a result, the second rotary member 300 is moved from the engagement position illustrated in for example FIG. 10 or FIG. 11 to the retraction position illustrated in FIG. 12. In doing so, the second rotary member 300 is rotated until the second detection section 700 detects the to-be-detected portion 330 in the present embodiment. This sets the second rotary member 300 at the second reference position P200. Note that the second rotary member 300 may be positioned at a retraction position other than the second reference position P200 in Step S1.

Next in Step S2, the objective lens 55 is detached from the microscope 1. Specifically, the user rotates the objective lens 55 and the first rotary member 200 to detach them from the revolving nosepiece 13. In doing so, the first rotary member 200 and the second rotary member 300 are out of contact with each other because the second rotary member 300 is positioned at the retraction position. Therefore, the objective lens 55 can be detached from the microscope 1 without the need to detach the second rotary member 300 and the drive section 400 from the microscope 1.

Next in Step S3, an objective lens 55 with a magnification different from that of the objective lens 55 having detached in Step S2 is attached to the microscope 1. In the following, the objective lens 55 with a magnification different from that of the objective lens 55 having detached in Step S2 may be referred to as "different objective lens 55". Specifically, the first rotary member 200 is fixed to the different objective lens 55. The user rotates the different objective lens 55 and the first rotary member 200 to attach them to the revolving nosepiece 13. In doing so, the first rotary member 200 and the second rotary member 300 do not engage with each other due to the second rotary member 300 being positioned at the retraction position. Therefore, the different objective lens 55 can be attached to the microscope 1 in a state in which the second rotary member 300 and the drive section 400 are left mounted on the microscope 1.

Next in Step S4, the first rotary member 200 is positioned at the first reference position P100. Specifically, the user rotates the different objective lens 55 and the first rotary member 200 relative to the revolving nosepiece 13. Upon the first detection section 600 detecting the to-be-detected portion 230 in doing so, the notification section 3 notifies the user of the first rotary member 200 being positioned at the first reference position P100. This makes the user to know that the first rotary member 200 has been positioned at the first reference position P100. The user then stops the rotation of the different objective lens 55 and the first rotary member 200. As a result, the first rotary member 200 and the second rotary member 300 are in the state illustrated in FIG. 12, for example.

Next in Step S5, the second rotary member 300 is caused to engage with the first rotary member 200. Specifically, the user operates the switching section 4a to move the second rotary member 300 from the retraction position to the engagement position. The controller 2a drives the drive section 400 for example for a predetermined time to rotate the second rotary member 300. This moves the second rotary member 300 to the engagement position illustrated in FIG. 10 from the retraction position illustrated for example in FIG. 12. That is, a second engagement portion 320 of the second rotary member 300 engages with a first engagement portion 211 of the first rotary member 200. The rotation position of the correction ring 55a can be adjusted as above through use of the adjusting section 4b.

The objective lens 55 is replaced in the manner described above.

Note that the revolving nosepiece 13 may be rotated in replacement of the objective lens 55. That is, the objective lens 55 may be replaced in a state in which the objective lens 55 is retracted from the object by rotation of the revolving nosepiece 13.

As has been described so far with reference to FIGS. 1 to 14, the second engagement portions 320 are arranged at a part in the circumferential direction of the second plate 310 and the second rotary member 300 rotates to be positioned at the engagement position where a second engagement portion 320 engages with a first engagement portion 211 or the retraction position where the second engagement portions 320 retract from the first engagement portions 211. In the above configuration, when the second rotary member 300 is positioned at the retraction position, the objective lens 55 and the first rotary member 200 can be rotated to be attached to or detached from the revolving nosepiece 13. Accordingly, the objective lens 55 can be replaced without the need to detach the second rotary member 300 and the drive section 400 from the microscope main body 10.

Furthermore, the first engagement portions 211 and the second engagement portions 320 are respectively indentations and pins as described above. In the above configuration, the first engagement portions 211 and the second engagement portions 320 can be easily designed, as will be described later, as compared to a case for example in which the first engagement portions 211 and second engagement portions 320 are gears.

Furthermore, compared to a case in which the first engagement portions 211 and the second engagement portion 320s are gears, there is no need to increase relative positional accuracy between the first engagement portions 211 and the second engagement portions 320. Furthermore, there is no need to form the first engagement portions 211 and the second engagement portions 320 for example along an involute curve, which facilitate production thereof.

As described above, the second engagement portions 320 protrude from the second plate 310 in the direction in which the rotation axis L310 extends. In the above configuration, an increase in size of the second rotary member 300 in a direction (radial direction) intersecting with the rotation axis L310 can be suppressed.

Furthermore, the first plate 210 is disposed on the side of the second plate 310 in the negative A direction. In the above configuration, the first plate 210 can be easily prevented from coming in contact with the second plate 310 in detachment of the objective lens 55 and the first rotary member 200.

Furthermore, as described above, the paired inner side surfaces 211a are in parallel to each other so as to extend from the outer periphery toward the central part of the first rotary member 200. In the above configuration, even when the second engagement portions 320 are moved in the radial direction of the first rotary member 200 along a first engagement portion 211, for example, the contact state of the second engagement portion 320 to the first engagement portion 211 is prevented from changing. Therefore, there is no need to increase relative positional accuracy between the first rotary member 200 and the second rotary member 300.

Furthermore, the number of the first engagement portions 211 is the same as the number of the second engagement portions 320 as described above. In the above configuration, the user can easily perceive which of the first engagement portions 211 corresponds to which of the second engagement portions 320. Therefore, the user can easily check the first engagement portions 211 and the second engagement portions 320 being or not being correctly engage for example without 1-pitch displacement.

Furthermore, as described above, the first detection section 600 is a member for detecting the rotation position of the first rotary member 200 being or not being positioned at the first reference position P100. As such, the first rotary member 200 can be easily positioned at the first reference position P100 through detection by the first detection section 600. Therefore, rotation of the second rotary member 300 from the retraction position to the engagement position can easily cause engagement of a second engagement portion 320 with a first engagement portion 211.

Figure 15:
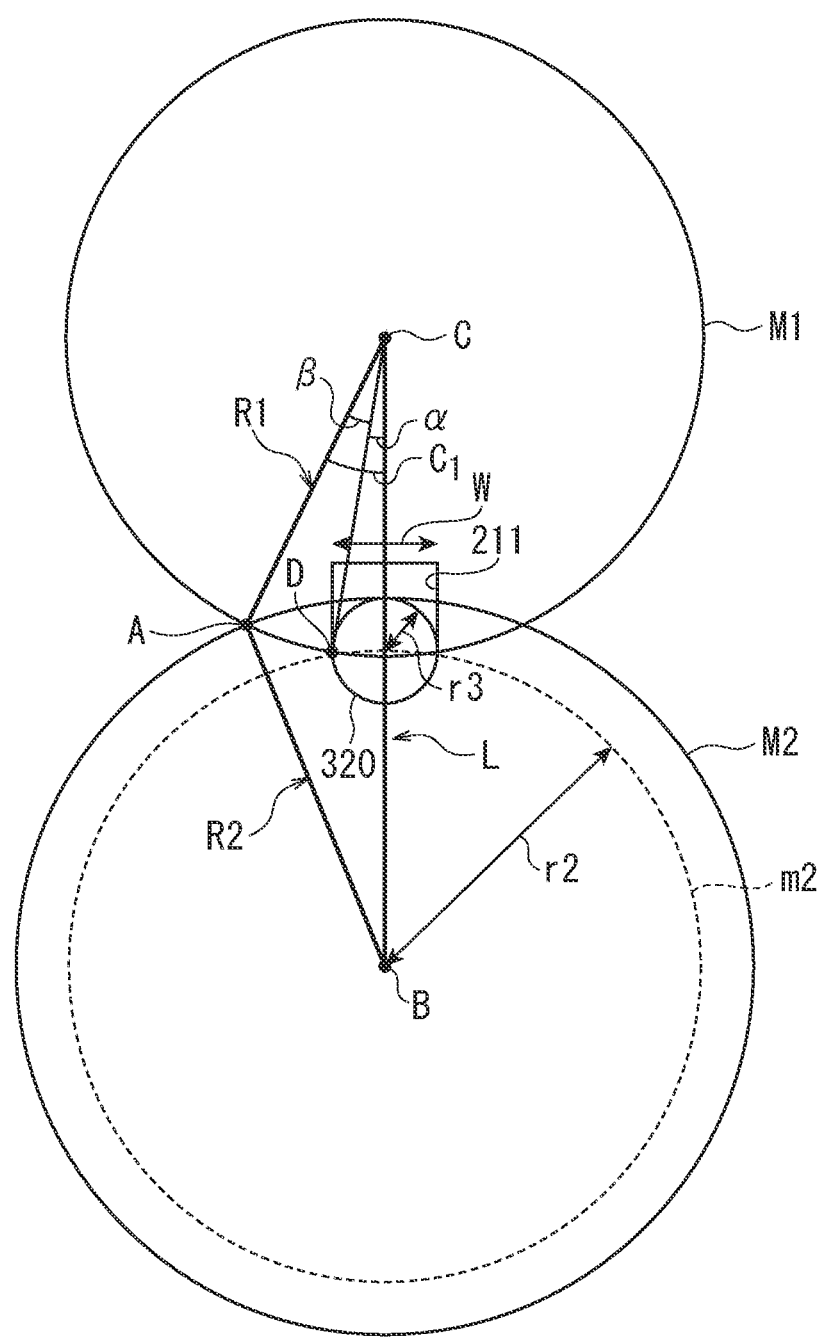
FIG. 15 is a schematic diagram explaining a positional relationship between the first engagement portion and the second engagement portion.

The positional relationship between the first engagement portions 211 and the second engagement portions 320 will be described next with reference to FIGS. 15 and 16. More specifically, description will be made of a method for calculating a movable range of the first rotary member 200. FIG. 15 is a schematic diagram explaining the positional relationship between a first engagement portion 211 and a second engagement portion 320. With reference to FIG. 15, a case will be described first in which one first engagement portion 211 and one second engagement portion 320 are provided.

As illustrated in FIG. 15, M1 denotes a track of the outer peripheral surface of the first plate 210 of the first rotary member 200, M2 denotes an outermost track (also referred simply to below as "track") of the outer circumferential surface of the second engagement portion 320 of the second rotary member 300, and m2 denotes a track of the center of the second engagement portion 320. Furthermore, R1 denotes the radius of the track M1, R2 denotes the radius of the track M2, r2 denotes the radius of the track m2, and r3 denotes the radius of the second engagement portion 320. A point A indicates an intersection point of the track M1 and the track M2, a point B indicates the rotational center of the second rotary member 300, and a point C indicates the rotational center of the first rotary member 200. Furthermore, L denotes the distance between the point B and the point C and W denotes the width of the first engagement portion 211. Where the center of the second engagement portion 320 is located on the straight line connecting the point B and the point C (in a state illustrated in FIG. 15), a point D indicates a contact point between the first engagement portion 211 and the outer circumferential surface of the second engagement portion 320, an angle $\alpha$ indicates an angle DCB, an angle $\beta$ indicates an angle DCA, and an angle $C_1$ indicates an angle ACB(=angle $\alpha$+angle $\beta$).

Here, when the second engagement portion 320 rotates in the anticlockwise direction about the point B as a center from the state illustrated in FIG. 15, the second engagement portion 320 is kept engaging with the first engagement portion 211 until the outer circumferential surface of the second engagement portion 320 reaches the point A. In other words, the movable range of the first rotary member 200 is an angle $\beta$(=angle $C_1$-angle $\alpha$) in anticlockwise rotation of the second engagement portion 320 from the state illustrated in FIG. 15.

The following is met in accordance with the low of cosines.

$\cos C_1 = (L^2 + R1^2 - R2^2)/(2 \times L \times R1)$

Furthermore, the following is met in accordance with the trigonometric ratio.

$\alpha = \sin^{-1}\{W/(2 \times R1)\}$

In other words, the following is met.

$R1 \times \sin\alpha = W/2$

Accordingly, the angle $\beta$(=angle $C_1$-angle $\alpha$) can be easily calculated.

For example, where R1=10 mm, R2=14 mm, r2=12 mm, L=20 mm, r3=2 mm, and W=4 mm, the following is met.

$$\text{Angle } \beta = \text{angle } C_1 - \text{angle } \alpha$$
$$= 40.54° - 11.54°$$
$$= 29°$$

FIG. 15 is a bilaterally symmetrical diagram. As such, the movable range of the first rotary member 200 is accordingly 29°×2=58°.

Figure 16:
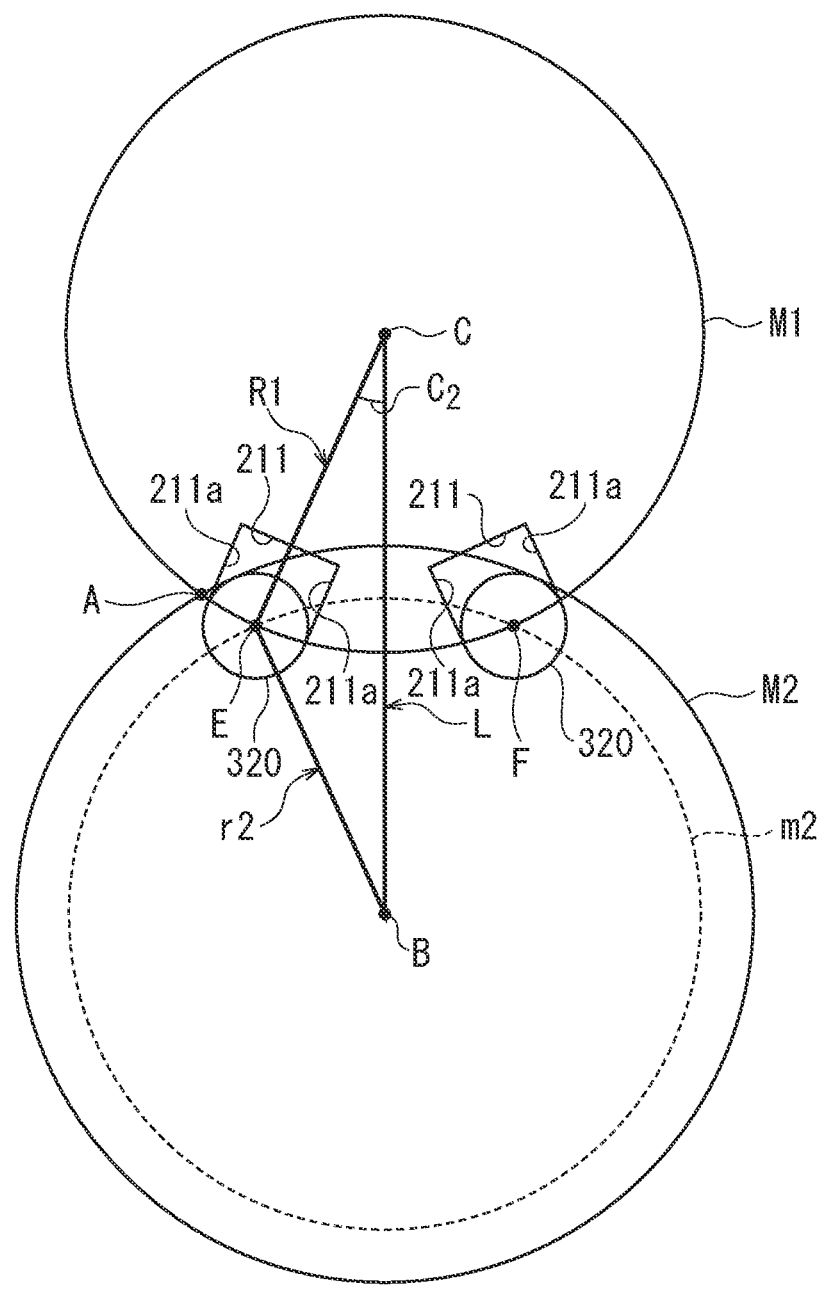
FIG. 16 is a schematic diagram explaining a positional relationship between first engagement portions and second engagement portions.

FIG. 16 is a schematic diagram explaining a positional relationship between first engagement portions 211 and second engagement portions 320. Next, a case will be described with reference to FIG. 16 in which two first engagement portions 211 and two second engagement portions 320 are provided.

As illustrated in FIG. 16, a point E and a point F indicate intersection points of the track M1 and the track m2. Furthermore, an angle $C_2$ indicates an angle ECB.

Here, the second engagement portion 320 positioned at the point E is in contact with the paired inner side surfaces 211a of the corresponding first engagement portion 211 in the state illustrated in FIG. 16. When the second rotary member 300 rotates anticlockwise from the state illustrated in FIG. 16, the second engagement portion 320 positioned at the point E moves outward from the inside of the corresponding first engagement portion 211. This releases simultaneous contact of the outer circumferential surface of the second engagement portion 320 with the paired inner side surfaces 211a of the first engagement portion 211. That is, a gap is generated between the second engagement portion 320 and the first engagement portion 211. As such, when the rotation of the second rotary member 300 switches for example from the anticlockwise direction to the clockwise direction, the rotation of the first rotary member 200 is no longer accompanied by the rotation of the second rotary member 300 by the amount of the gap.

In view of the foregoing, the angular distance between the two second engagement portions 320 is set so that the center of one of the second engagement portions 320 is positioned at the point F when the center of the other second engagement portion 320 is positioned at the point E. In the above configuration, a phenomenon can be prevented in which the rotation of the second rotary member 300 is not accompanied by the rotation of the first rotary member 200.

Specifically, the following is met in accordance with the low of cosines.

$\cos B = (L^2 + r2^2 - R1^2)/(2 \times L \times r2)$

For example, where R1=10 mm, r2=12 mm, and L=20 mm as above, the following is met.

Angle B≈22°

FIG. 16 is a bilaterally symmetrical diagram. As such, the angular distance between the two second engagement portions 320 is approximately 44°(=22°×2).

Next, an angular distance between the two first engagement portions 211 is calculated. Specifically, the following is met in accordance with the low of cosines.

$\cos C_2 = (L^2 + R1^2 - r2^2)/(2 \times L \times R1)$

For example, where R1=10 mm, r2=12 mm, and L=20 mm as above, the following is met.

Angle $C_2$≈27°

FIG. 16 is a bilaterally symmetrical diagram. As such, the angular distance between the two first engagement portions 211 is approximately 54°(=27°×2).

Furthermore, the movable range of the first rotary member 200 is a value obtained by adding approximately 54° that is the angular distance between the two first engagement portions 211 to 58° that is calculated in a case with one first engagement portion 211. That is, the movable range of the first rotary member 200 is approximately 112°=58°+approximately 54°.

Note that in a case in which n first engagement portions 211 and n second engagement portions 320 are provide, the movable range of the first rotary member 200 is a value obtained by adding 58° that is calculated in a case with one first engagement portion 211 and a value obtained by multiplying (n−1) by approximately 54° that is the angular distance between the first engagement portions 211. That is, the movable range of the first rotary member 200 is approximately 58°+approximately 54°×(n−1).

As has been described so far with reference to FIGS. 15 and 16, the first rotary member 200 and the second rotary member 300 can be easily designed in the present embodiment. Note that the present disclosure is not limited to the above example in which the movable range of the first rotary member 200 is calculated using the radius R1 of the track M1, the radius R2 of the track M2, the radius r2 of the track m2, the radius r3 of the second engagement portions 320, the distance L between the point B and the point C, and the width W of the first engagement portions 211. Needless to say, the radius R1, the radius R2, the radius r2, the radius r3, or the distance L can be calculated after the movable range of the first rotary member 200 is set.

Figure 17:
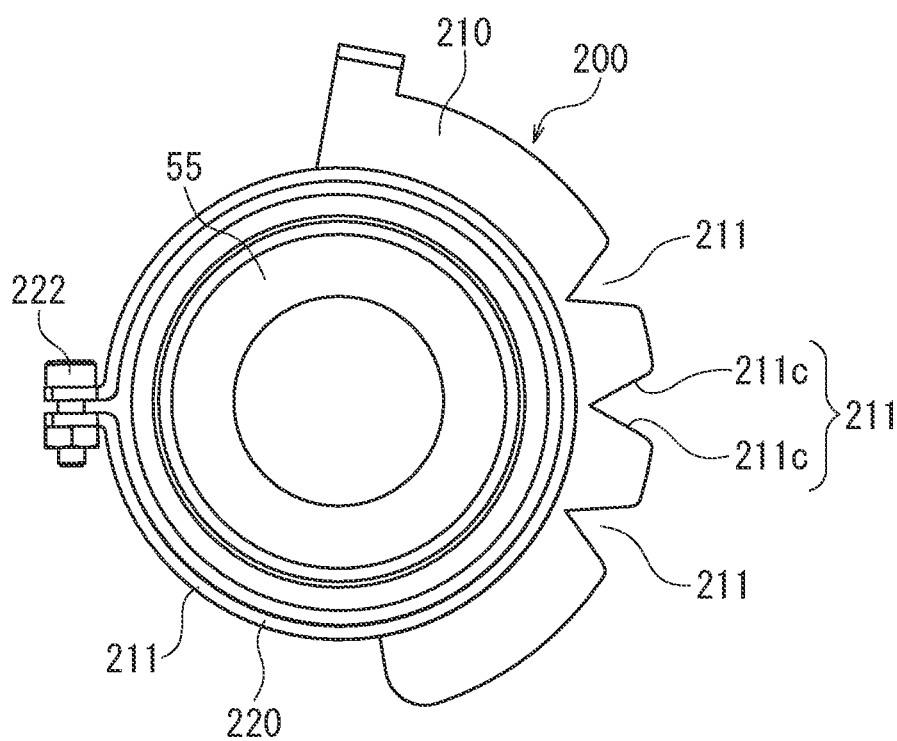
FIG. 17 is a diagram illustrating each configuration of an objective lens and a first rotary member of an objective lens unit according to a variation of the present disclosure.

Next, an objective lens unit 100 according to a variation of the present disclosure will be described with reference to FIG. 17. FIG. 17 is a diagram illustrating each configuration of an objective lens 55 and a first rotary member 200 of the objective lens unit 100 according to the variation of the present disclosure as viewed from the negative A direction.

As illustrated in FIG. 17, first engagement portions 211 each have paired inner side surfaces 211*c* in the objective lens unit 100 of the variation of the present disclosure. The paired inner side surfaces 211*c* extend toward the central part from the outer periphery of the first rotary member 200. Unlike the paired inner side surfaces 211*a* in the above embodiment, the paired inner side surfaces 211*c* are located so as to intersect each other. The first engagement portions 211 are V-shaped, for example.

The other configuration and the replacement method of the objective lens unit 100 of the variation of the present disclosure are the same as those in the above embodiment.

An embodiment of the present disclosure has been described so far with reference to the accompanying drawings. However, the present disclosure is not limited to the above embodiment and may be implemented in various manners within a scope not departing from the gist thereof. Various disclosures can be formed by appropriately combining elements of configuration disclosed in the above embodiment. For example, some elements of configuration may be omitted from all the elements of configuration indicated in the embodiment. Any elements of configuration in different embodiments may be combined as appropriate. The drawings schematically illustrate elements of configuration in order to facilitate understanding. Properties such as thickness, length, number, and intervals of elements of configuration illustrated in the drawings may differ from actual properties in order to facilitate preparation of the drawings. Furthermore, the material, shape, dimension, and the like of each element of configuration indicated in the above embodiment are examples and not particular limitations. Various alterations may be made so long as there is no substantial deviation from the effects of the present disclosure.

For example, example in which the first engagement portions 211 (indentations) are U-shaped and V-shaped have been presented above in the embodiment and the variation, respectively, which should not be taken to limit the present disclosure. The first engagement portions 211 (indentations) may have any shape other than the U-shape and the V-shape.

Furthermore, an example in which the first engagement portions 211 include indentations and the second engagement portions 320 include pins has been presented in the above embodiment, which should not be taken to limit the present disclosure. For example, the first engagement portions may include pins and the second engagement portions may include indentations. Alternatively, both the first engagement portions and the second engagement portions may include indentations. Alternatively, both the first engagement portions and the second engagement portions may include pins. Alternatively, both the first engagement portions and the second engagement portions may be gears.

Furthermore, an example in which the second engagement portions 320 are columnar or cylindrical in shape has been presented in the above embodiment, which should not be taken to limit the present disclosure. For example, the second engagement portions 320 may have a polygonal prism shape or an elliptical cylinder shape. However, it is preferable that a part of the surface of each second engagement portion 320 that is to come into contact with the inner side surface of the corresponding first engagement portion 211 is a curved surface.

Furthermore, an example in which the second engagement portions 320 protrude from the second plate 310 in the direction in which the rotation axis L310 extends has been presented in the above embodiment, which should not be taken to limit the present disclosure. For example, the second engagement portions may protrude from the second plate 310 in the direction (radial direction) intersecting the rotation axis L310.

Furthermore, an example in which the first plate 210 is disposed on the side of the second plate 310 in the negative A direction has been presented in the above embodiment, which should not be taken to limit the present disclosure. For example, the first plate 210 may be disposed on the side of the second plate 310 in the positive A direction relative. In this case, for example, an indentation through which the first plate is passable may be formed in the second plate 310 or the second plate 310 may formed into a semicircular shape or fan shape in order that the first plate 210 does not come into contact with the second plate 310.

Furthermore, although an example in which the number of the indentations is the same as the number of the pins has been presented in the above embodiment, the number of the indentations may differ from the number of the pins.

Furthermore, an example in which the first detection section 600 is provided in order to detect the rotation position of the first rotary member 200 being or not being positioned at the first reference position P100 has been presented in the above embodiment, which should not be taken to limit the present disclosure. For example, the user may visually check the rotation position of the first rotary member 200 being or not being positioned at the first reference position P100.

Furthermore, an example in which the second detection section 700 is provided in order to detect the rotation position of the second rotary member 300 being or not being positioned at the second reference position P200 has been presented in the above embodiment, which should not be taken to limit the present disclosure. For example, the user may visually check the rotation position of the second rotary member 300 being or not being positioned at the second reference position P200.

Furthermore, an example in which the switching section 4a and the adjusting section 4b are provided in order to rotate the second rotary member 300 has been presented in the above embodiment, which should not be taken to limit the present disclosure. For example, the second rotary member 300 may be moved between the retraction position and the engagement position using the adjusting section 4b without providing the switching section 4a.

Furthermore, an example in which the objective lens 55 is disposed above the object has been presented in the above embodiment, which should not be taken to limit the present disclosure. For example, the objective lens 55 may be disposed below the object for observation of the object from below.

Furthermore, an example in which the microscope 1 is provided with the eyepiece 14 has been presented in the above embodiment, which should not be taken to limit the present disclosure. For example, a display section that displays an enlarged image of the object may be provided without providing the eyepiece 14. In addition, the microscope 1 may be configured to transmit data of the enlarged image to another display device.

What is claimed is:

1. An objective lens unit comprising:
an objective lens provided with a correction ring;
a first rotary member that is mounted on the objective lens and that rotates together with the correction ring;
a second rotary member that engages with the first rotary member to rotate the first rotary member; and
a drive section that rotates the second rotary member, wherein the first rotary member has an outer peripheral surface and a first engagement portion formed in the outer peripheral surface,
the second rotary member has a second engagement portion that is to engage with the first engagement portion,
the second engagement portion is disposed at a part in a circumferential direction of the second rotary member, and
the second rotary member rotates to be positioned at an engagement position or a retraction position, the engagement position being a position where the second engagement portion engages with the first engagement portion, the retraction position being a position where the second engagement portion retracts from the first engagement portion.

2. The objective lens unit according to claim 1, wherein one of the first engagement portion and the second engagement portion is provided as one or more indentations, and
another of the first engagement portion and the second engagement portion is provided as one or more pins that are to engage with the one or more indentations.

3. The objective lens unit according to claim 2, wherein the first engagement portion is provided as the one or more indentations,
the second engagement portion is provided as the one or more pins,
the first rotary member includes a first plate with the outer peripheral surface and the first engagement portion,
the second rotary member includes a second plate extending in a direction intersecting a rotation axis of the second rotary member, and
the second engagement portion protrudes from the second plate in a direction in which the rotation axis of the second rotary member extends.

4. The objective lens unit according to claim 3, wherein the objective lens has:
a first end that is located at an end in a first direction and that is to be opposite to an object; and
a screw part that is located at an end in a second direction opposite to the first direction and that has a screw thread, and
the first plate is disposed on a side of the second plate in the first direction.

5. The objective lens unit according to claim 2, wherein the one or more indentations each have paired inner side surfaces located so as to catch a corresponding one of the one or more pins, and
the paired inner side surfaces are located substantially in parallel to each other so as to extend from an outer periphery of the first rotary member toward a central part of the first rotary member.

6. The objective lens unit according to claim 2, wherein the number of the one or more indentations is the same as the number of the one or more pins.

7. The objective lens unit according to claim 1, further comprising
a detection section that detects a rotation position of the first rotary member being or not being positioned at a reference position, wherein
the reference position is a position where the second engagement portion engages with the first engagement portion in rotation of the second rotary member from the retraction position to the engagement position.

8. A microscope comprising:
the objective lens unit according to claim 1; and
a microscope main body on which the objective lens unit is mounted.

* * * * *